Figure 1:
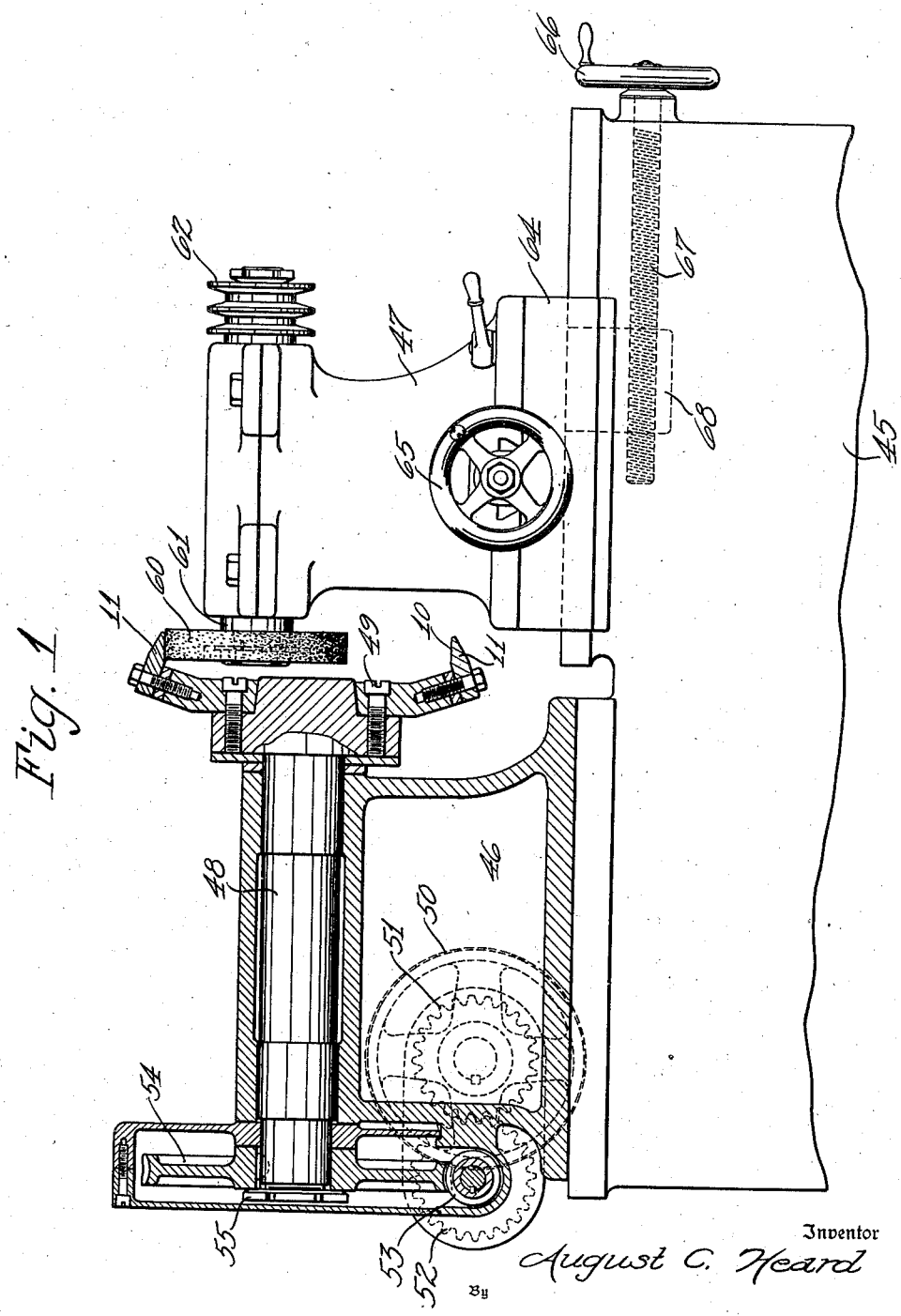

May 14, 1935. A. C. HEARD 2,001,021
METHOD OF AND MACHINE FOR RELIEVING GEAR CUTTERS
Filed Feb. 23, 1934 2 Sheets-Sheet 2

Inventor
August C. Heard
By
B. F. Schlesinger
Attorney

Patented May 14, 1935

2,001,021

UNITED STATES PATENT OFFICE 2,001,021

METHOD OF AND MACHINE FOR RELIEVING GEAR CUTTERS

August C. Heard, Rochester, N. Y., assignor to Gleason Works, Rochester, N. Y., a corporation of New York Application February 23, 1934, Serial No. 712,600

4 Claims. (Cl. 51—105)

The present invention relates to face-mill gear cutters and particularly to the grinding of cutting clearance on the sides of the blades of such cutters.

The present invention is a further development of the basic invention described in the pending application of Joseph Gstyr, Serial No. 648,759, filed December 24, 1932, and has for its purpose principally to simplify the construction of the grinding machine whereby to adapt the basic process more readily to high-production work where a particular type of cutter blade is to be made in large quantities.

The Gstyr invention constitutes an improvement over prior practice in that the required cutting clearance is ground on the sides of the blades without a relieving motion. The blades are mounted obliquely in a rotary head, which is a dummy head and which differs from the face-mill cutter head in which the blades are mounted during cutting, and the blades are ground by rotating the dummy head on its axis to carry the blade-surfaces over a rotating cylindrical grinding wheel. The obliquity of position of the blades in the dummy head is determined by the amount of cutting clearance required back of the cutting edges. One side of the blades is ground at a time for the blades must be mounted at different oblique angles in order to grind the required clearance on their opposite sides.

In the Gstyr process, the grinding wheel is adjusted so that its axis is inclined to the axis of the head in accordance with the pressure angle of the side surfaces of the blades to be ground.

The present invention follows the Gstyr process in the mounting of the blades obliquely in a head and in the grinding of the blades by a quasi-cylindrical grinding process. Its novelty consists, however, in mounting the blades in the dummy head so that their cutting edges and, in general, the elements of their side surfaces are parallel to the axis of the head. This permits of grinding the blades with a cylindrical wheel whose axis is parallel to the axis of the head.

By using proper dummy heads, then, the side surfaces of all blades regardless of whether they are inside or outside blades and regardless of pressure angle can be ground according to the present invention with a cylindrical wheel whose axis is parallel to the axis of the head. The wheel support can, therefore, be fixed on the grinding machine. Hence, the grinding machine can be made simpler, cheaper, and more rigid and, in addition, can be set up faster.

These are the principal objects of the present invention. Other objects will appear hereinafter from the specification and from the recital of the appended claims.

Figure 2:
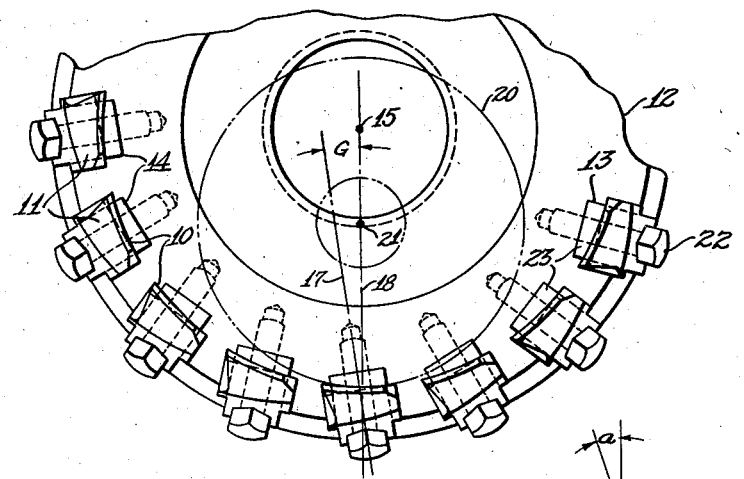
Figure 3:
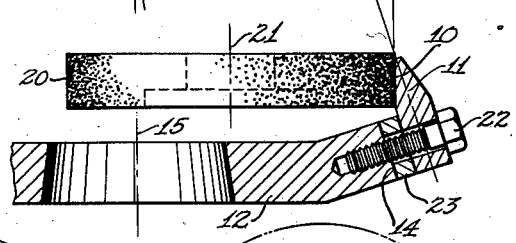
Figure 4:
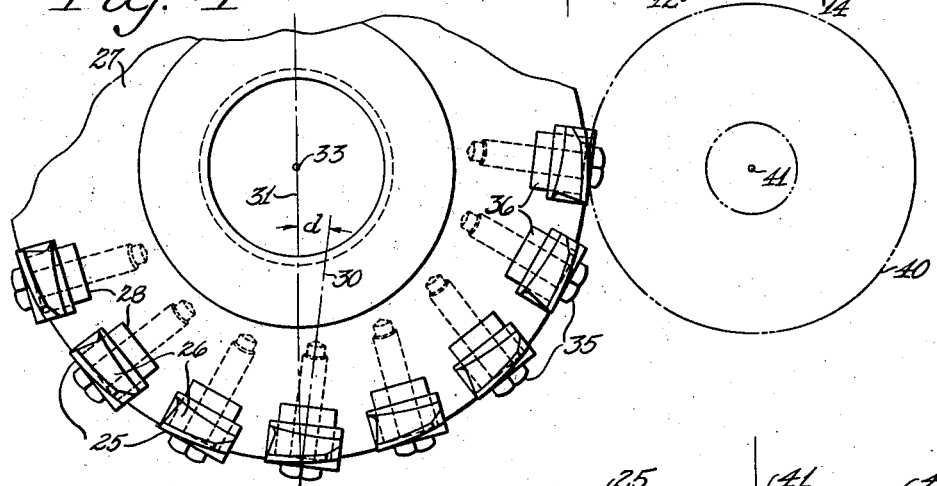
Figure 5:
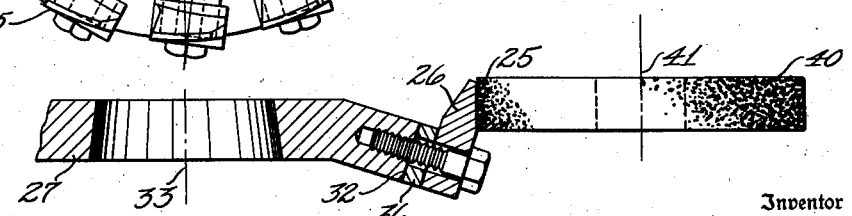

In the drawings:

Fig. 1 is a side elevation, partly in section, of a grinding machine constructed according to the present invention for grinding cutting clearance on the sides of blades of a face-mill gear cutter;

Figs. 2 and 3 are a fragmentary plan view and a fragmentary sectional view, respectively, illustrating how the inside surfaces of the blades of a face-mill gear cutter are ground according to the present invention; and Figs. 4 and 5 are a fragmentary plan view and a fragmentary sectional view, respectively, illustrating how the outside surfaces of the blades of a face-mill gear cutter are ground according to the present invention.

Referring now to Figs. 2 and 3, it will be seen first how the cutting clearance on the inside faces 10 of a series of face-mill cutter blades 11 is to be ground. The inside surfaces of these blades have a pressure angle $a$ which usually corresponds to the pressure angle of the gear tooth surfaces to be cut thereby.

To grind the inside surfaces of the blades, a dummy head 12 is used, which differs from the head of the face-mill cutter, in which the blades are mounted for cutting, in two respects: (1) The blade-receiving slots 13 of this dummy head 12 are disposed at a different position with reference to a radius of the head than are the blade-receiving slots of the cutter head with reference to a radius of the cutter head, and (2) the inside walls 14 of the slots 13 of the dummy head are inclined to the axis 15 of the dummy head at an angle equal to the inside pressure angle $a$ of the blades so that, when the blades 11 are secured in the slots 13, and are ground, their inside cutting edges and, in general, the elements of their inside surfaces 10, will be parallel to the axis 15 of the head.

In the head 12, shown in Figs. 2 and 3, the slots 13 are non-radial of the axis 15 of the head, that is, the center line 17 of each slot is inclined to a radius 18 of the head and the angle G of inclination of the slot to the radius is determined by the amount of clearance which it is desired to grind on the inside surfaces of the blades back of the inside cutting edges. The blades of a standard face-mill gear cutter for cutting gears in an intermittent indexing process would be positioned in a dummy head like the blades 11 shown. The blades of a face mill hobbing cutter for cutting longitudinally curved tooth gears in a continuous indexing process if oblique to a radius of cutter head, might be positioned radially in a dummy head in order to permit grinding the proper cutting clearance.

The blades 11 are secured in the head 12 by bolts 22 and may be adjusted radially of the head by shims 23. The head 12 may have the form of a flat disc but preferably is dish-shaped as shown clearly in Fig. 3. When the head is of the latter shape, the bolts will enter centrally with reference to the thickness of metal in the head.

The surfaces 10 of the blades 11 are ground by a cylindrical grinding wheel 20 which is so positioned that its axis 21 is parallel to the axis 15 of the dummy head 12. The wheel is driven at the high speed required for grinding and is moved slowly over the side surfaces of the blades to grind these surfaces. Preferably the latter motion is effected by rotating the head 12 on its axis, but the head might be held stationary and the rotating wheel might be revolved about the axis 15 of the head.

Since the blades are obliquely positioned in the head 12 as contrasted with their radial position when cutting, the proper cutting clearance will be ground on the inside surfaces 10 of the blades, and since the blades are also positioned so that the elements of the inside surfaces are parallel to the axis 15 of the head, the proper pressure angle will simultaneously be ground on the inside surfaces of the blades.

In Figs. 4 and 5, there is shown how to grind the outside surfaces 25 of face-mill cutter blades 26. These blades might be identical with the blades 11 already described. A second dummy head 27 is used whose blade-receiving slots 28 are oppositely inclined to a radius of the head from the slots 13 of the head 12. The angle of inclination $d$ of the center lines 30 of the slots 28 to a radius 31 of the head is determined as in the case of the inside blades 11 by the cutting clearance desired on the outside surfaces 25 back of the cutting edges.

The inside walls 32 of the slots 28 are inclined to the axis 33 of the dummy head 27 at an angle equal to the pressure angle desired on the outside surfaces 25 of the ground blades. Hence, when the blades 26 are secured in the slots 28, the elements of the outside surfaces of the blades will extend parallel to the axis 33 of the head.

Preferably the head 27 will also be of dished shape, but its dish will be, as clearly shown in Fig. 5, in the opposite direction from the dish of the head 12. The blades 26 are secured in the slots 28 by bolts 35 while shims 36 may be used to adjust the blades radially of the head.

The outside surfaces of the blades are also ground with a cylindrical wheel. This wheel 40 is positioned in engagement with the outside surface 25 of a blade 26 with the axis 41 of the wheel parallel to the axis 33 of the dummy head. Then while the grinding wheel is rotated rapidly on its axis at the required grinding speed, either the head 27 or the wheel is revolved about the axis 33 of the head to grind the outside surfaces 25 of the blades.

Due to their oblique position, as compared with their radial position when cutting, the proper cutting clearance will be ground on the outside surfaces of the blades and due to the fact that the inside walls 32 of the slots 28 are inclined at the required pressure angle to the axis 33 of the head, the correct pressure angle will simultaneously be ground on the outside surfaces of the blades.

The grinding process of the present invention being a form of cylindrical grinding will produce blades having very smooth side surfaces, but the smoothness of these surfaces may be still further enhanced, if desired, by imparting a rapid but short axial reciprocating motion to the grinding wheel 20 or 40 as it rotates on its axis. This motion and its advantages has been completely described in the Gstyr application above mentioned and need not be further described here.

Due to the method of grinding, the side surfaces of blades ground according to the present invention will be cylindrical surfaces of revolution and not helical surfaces as are the surfaces of blades ground in the known relieving processes.

The same wheel 20 or 40 may be used for grinding both the inside and outside surfaces of a blade and all that is required to grind either the outside or inside surface of a blade of any given pressure angle is a suitable dummy head. Therefore, a machine can be constructed for practicing the present invention in which neither the wheel support nor the head support has an angular adjustment. This contrasts favorably with previous machines for grinding clearance on face mill cutter blades because on previous machines an angular adjustment of either the wheel or the blade-carrying head was required in order to grind the required pressure angle on the sides of the blades. In Fig. 1, I have shown a machine constructed according to one embodiment of my invention.

45 designates the base of this machine. On this is mounted a fixed standard or support 46 and an adjustable standard or support 47. The fixed standard or support 46 is formed with bearings in which is journaled the spindle 48 to which is secured the dummy head 12 or 27 that carries the blades to be ground. In Fig. 1, the machine is shown as set up for grinding the inside faces 10 of a series of blades 11 and the head 12 is, therefore, shown mounted on the nose of the spindle 48. The head 12 is secured to the spindle 48 by bolts 49.

The spindle 48 is driven from a pulley 50 through spur gears 51 and 52, the worm 53 and the worm wheel 54. The worm wheel 54 is keyed to the spindle 48 and is held on the spindle against axial movement by a nut 55.

The grinding wheel 60 for grinding the blades is secured to a spindle 61 that is journaled in the standard 47. The spindle 61 is driven by a pulley 62, which like the pulley 50, already mentioned, may be driven from any suitable source of power.

The standard 47 is mounted on a plate 64 for adjustment in a direction at right angles to the axis of the spindles 48 and 61, while the plate 64 is mounted on the base 45 for adjustment in a direction at right angles to the direction of adjustment of the standard 47. The adjustment of the standard 47 on the plate 64 is effected by rotation of a handwheel 65 through medium of a screw and nut not shown. The adjustment of the plate 64 on the base 45 is effected by rotation of a handwheel 66 through medium of a screw 67, that is journaled in the base 45, and a nut 68 which is secured to the plate 64.

The two adjustments of the standard 47 on the base 45 serve to permit moving the grinding wheel into and out of operative engagement with the blade-surfaces to be ground, the adjustment of the standard 47 on the plate 64 serving in particular to permit adjusting the grinding wheel for grinding both inside and outside surfaces of blades and blades for face-mill cutters of different diameters.

When the grinding wheel has been adjusted into operative position and the machine is started, the wheel will rotate on its axis and the dummy head on its axis and thus the required side surfaces will be ground on the blades to the proper cutting clearance. The amount of stock to be ground off the blades can be controlled by adjustment of the standard 47 on the plate 64.

While the invention has been described in connection with a particular purpose and a specific embodiment of a machine has been described, it will be understood that the present application is intended to cover any adaptations, uses, or modifications of the invention, following, in general, the principles of the invention and including such departures from the present disclosure as come within known or customary practice in the art to which the invention pertains and as may be applied to the essential features herein before set forth and as fall within the scope of the invention or the limits of the appended claims.

Having thus described my invention, what I claim is:

1. The method of grinding clearance on the sides of face-mill cutter blades of a given pressure angle which comprises mounting the blades in a rotary head so that they are inclined to a radius of the head at a different angle from the position they occupy when cutting and so that the finished side surfaces to be ground are parallel to the axis of the head instead of being inclined thereto at the given pressure angle, engaging a cylindrical grinding wheel with said blades with the axis of the wheel parallel to the axis of the head, and rotating the wheel and head on their respective axes.

2. The method of grinding clearance on the sides of face-mill cutter blades of a given pressure angle which comprises mounting the blades in a head so that they are inclined to a radius of the head at an angle determined by the amount of clearance to be ground on the sides of the blades and so that the finished side surfaces to be ground will be parallel to the axis of the head, instead of being inclined thereto at the given pressure angle engaging a cylindrical grinding wheel with said blades with the axis of the wheel parallel to the axis of the head, and rotating the wheel on its axis while producing a relative rotary movement between the wheel and head about the axis of the head.

3. In a machine for grinding clearance on the sides of face-mill cutter blades of a given pressure angle, a work spindle and a wheel spindle, the axes of which are parallel, a cylindrical grinding wheel secured to the wheel spindle, a head secured to the work spindle and provided with slots to receive the cutter blades, said slots being inclined to a radius of the head in accordance with the amount of side clearance required on the particular side surface being ground, and having inside walls inclined to the axis of the head at an angle corresponding to the pressure angle of the side surfaces of the blades to the ground, and means for rotating the work and wheel spindles.

4. In a machine for grinding clearance on the sides of cutter blades of a given pressure angle, a rotary grinding wheel, a work support adapted to hold a plurality of blades to be ground in circular arrangement thereon with the blades inclined to a radius of the circle at an angle determined by the amount of cutting clearance required on one side of the blades and with the blades also arranged so that elements of the side to be ground, when it is finished, will be parallel to an axis passing through the center of said circle and parallel to the line of contact between said wheel and the blades when in operating position, means for adjusting the wheel and work support into operating position, means for rotating the wheel on its axis, and means for simultaneously producing rotational movement between the wheel spindle and the work head about the first-named axis.

AUGUST C. HEARD.